United States Patent Office 3,069,215
Patented Dec. 18, 1962

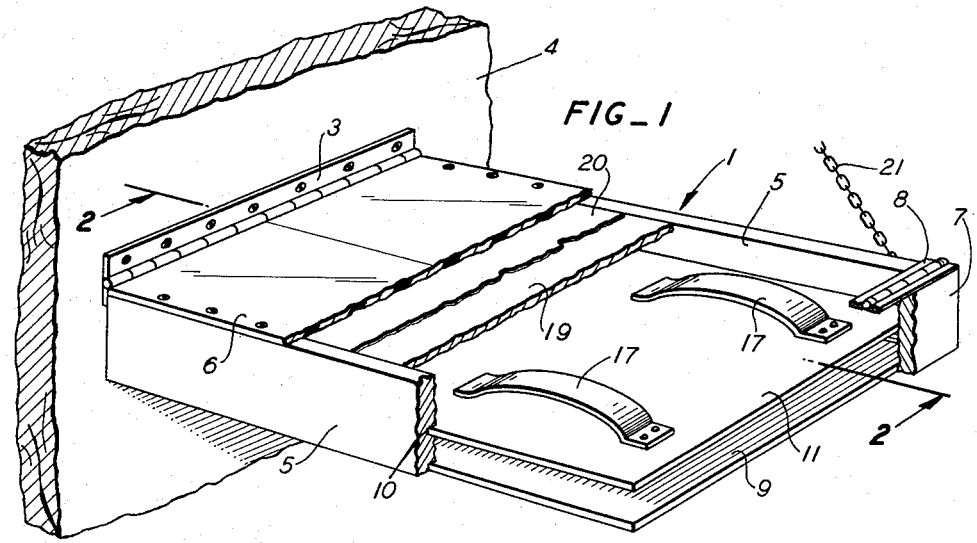

3,069,215
SMALL BOAT CHART STOWAGE AND PLOTTING CASE
William S. Dodge, 2375 44th Ave., San Francisco, Calif.
Filed Apr. 10, 1961, Ser. No. 102,016
2 Claims. (Cl. 312—117)

This invention relates to a stowage and plotting case for charts used on boats for navigation purposes, and has for one of its objects the provision of a small, convenient, weather proof case adapted for use on small boats where otherwise the charts used would be injured, if not completely ruined, by spray or rain.

Another object of the invention is the provision of a chart case enclosing and fully protecting the chart being used, yet is constructed to enable the navigator to have the chart visible at all times and to plot a course thereon with accuracy, without disfiguring the chart in any way, and which structure enables removing the plotted lines and accurately replotting other courses without touching the chart.

In explanation of the above, in small boats that navigate along the coast of the ocean or on any body of water where courses are plotted on charts, the usual manner has been to draw the course directly on the chart, the latter being exposed. Where the weather is foul, or there is spray, the chart used is many times subjected to injury from wind or moisture or both and the damage may be so great as to render the chart of little, if any, value.

Also, in navigating over a substantial distance, several charts having different sections of the area travelled may be used in succession, and heretofore the changing of one chart to another, and the stowing of the used chart, has been awkward and relatively troublesome, particularly where the charts may be subjected to wind, spray or rain or all during the change.

One object of the invention is the provision of means that is adapted to overcome the above difficulties and objections.

Furthermore, it has heretofore been customary, as has been explained, to chart courses directly on the relatively expensive charts, with the result that the charts have a very limited useful life.

With the present invention, means is provided for yieldably holding each chart flat against the underside of a transparent wall of the chart case thereby enabling the navigator to chart a course on said wall with a common grease pencil, and to wipe off the plotted course, or make changes in it, without touching the chart, and the structure also enables the uppermost chart of a group or plurality of superposed charts below such transparent wall, to be successively removed and stowed in the case below the group in reverse order, so the charts so removed can be replaced as a group below the transparent wall for use, in order, on the return trip.

Other objects and advantages will appear in the description and drawings.

In the drawing, FIG. 1 is an isometric view of the chart case hingedly supported horizontally on a bulkhead for swinging upwardly to vertical position against said bulkhead when the case is not in use. Parts of the case are broken away to show the interior structure.

FIG. 1 taken along line 3—3 of FIG. 2.

FIG. 2 is a horizontal sectional view of the case of FIG. 1 taken longitudinally of the case along line 2—2 of FIG. 1.

FIG. 3 is a horizontal sectional view of the case of FIG. 1 taken along line 3—3 of FIG. 2.

FIG. 4 is an enlarged fragmentary horizontal sectional view taken longitudinally of the case through the inner end portion that is adjacent to the bulkhead or wall on which the case is supported, to show the map support tilted for withdrawal of the uppermost map without displacing the others.

In the following description the chart case will be considered as being horizontally disposed in a position for use. The "inner" end or "rear" end of the case will be the end adjacent to the bulkhead and the "outer" end or "front" end will be the end remote from the bulkhead.

It is to be understood that the case may be mounted on legs, or may be used entirely separate from the bulkhead, but in small boats space is usually at a premium, and it has been found convenient and practical to mount the chart case as shown.

The chart case, generally designated 1, is rectangular and flat, having an inner or rear end wall 2 (FIG. 2) that is connected by a hinge 3 to the bulkhead 4.

Parallel spaced, opposed, side frame members 5 of equal length are secured at one of their corresponding ends to the ends of the end wall 2 and form two of the lateral sides of the case.

A transparent, horizontal sheet of any suitable plastic material provides a top wall 6 and this sheet extends over the upper edges of the rear and side walls of the case to which the marginal portions of said top wall are secured by screws or in any other suitable manner with the upper surface of said top wall being planar and terminating even with the lateral outermost surfaces of two of the opposed side walls 5 (FIG. 3) whereby plotting instruments such as rulers and the like will be adapted to be flat on said upper surface when projecting laterally therefrom at one or the other of said side walls 5. The forward edge of the upper wall 6 terminates substantially even with the forward ends of side walls 5, and a front wall 7 extends from the front edge of the top wall downwardly across the open front end of the case, being hingedly secured along its upper edge to the top wall 6 as indicated at 8.

A bottom wall 9 is secured to the lower edges of the side walls 5, and rear wall 2. Said rear and side walls are preferably rabbeted to receive the lateral marginal portions of the bottom wall in the interest of conserving space (FIG. 3).

It may here be emphasized that the space on small boats is usually very limited, hence any saving in space is important.

The opposed faces of side walls 5 are formed with parallel grooves 10 (FIG. 3) along lines intermediate the upper and lower edges of said side walls longitudinally of the latter and substantially parallel with said upper and lower edges to slidably receive the side edges of a rectangular horizontal partition 11 that divides the case into an upper compartment 12 and a lower compartment 13.

Said rear wall 2 may have a forwardly projecting wedge member 14 (FIG. 3) secured thereto at a point intermediate the side walls 5 with the narrow end of said member directed forwardly. The upper surface of said member 14 slants upwardly from its forward edge to a point level with the lower sides of the grooves 10 so that the panel will be guided and supported at its rear end against the likelihood of sagging or warpage under downward pressure, and angle or channel strips 15, secured to the underside of the partition 11 wherever required, will also function to prevent sagging or warpage of the partition.

The partition 11 has upwardly bowed elongated leaf springs 17 secured at one of their ends to the upper side of said partition 11. These springs extend longitudinally of the partition and may be in any suitable arrangement. In the drawings the springs 17 are arranged in two pairs, one pair being on the forward half of the partition and the other pair being on the rear half of said partition, with the springs of each pair thereof equally spaced from a medial line extending longitudinally of said partition and the springs 17 also extend longitudinally of the partition.

The forward ends of said springs 17 are flattened to be flat against the upper flat side of partition 11 and they may be secured to the partition by screws or any other suitable means.

The rear ends of the springs may be reversely curved relative to the main curve of the intermediate portion of the springs so as to present convex surfaces in slidable engagement with the partition 11.

Supported on the convex upwardly facing surfaces of springs for sliding on said springs longitudinally of the latter is a chart supporting panel 19. This panel extends between the sides and front and rear ends of the case, and is adapted to support a plurality of superposed charts 20 thereon.

The springs will support the panel 19 thereon for sliding in and out of the case and will yieldably hold the top chart flat and against the lower surface of the top wall 6. Also the panel 19 may be tilted relative to the top wall. Thus when the navigator wishes to remove the top chart, it is only necessary to press the front edge of the panel downwardly and pull the top map out of the case. FIG. 4 shows that there will be the minimum of frictional resistance between the top of the case and the second chart (from the top) of the charts on panel 19 when the latter is tilted, hence the top chart is readily removed without dragging any of the charts therebelow with it.

If the navigator may wish to rearrange the charts or to insert additional charts, the panel 19 may quickly be withdrawn with all of the charts thereon, or the entire stack of charts can be removed without withdrawing the panel 19.

The compartment 13 is a stowage compartment in which any desired number of charts may be stowed, and in which charts removed from compartment 12 may be stowed.

The top wall 6, being transparent, enables the navigator to mark or plot a course directly on said wall with any suitable means, such for example, as a grease pencil. The fact that the chart is held flat against the underside of the top wall eliminates any distortion that might occur were the chart to be in a position at any part thereof spaced below the top wall 6.

The top chart in the case will not be defaced by courses plotted on the wall 6, and such marks as may be placed thereon are readily removed.

Also, all charts are thoroughly protected against injury. The front wall 7 is suspended, and may be latched or locked in closed position if desired. It will swing upwardly and against the top wall when swung to open position, so does not need holding when in open position. Chains 21 (FIG. 1) (only one shown) may extend from opposite corners of the front end of the case to hold the case horizontal, and when not in use the case may be swung upwardly against bulkhead 4 and held by connecting a link of one or both chains to any suitable hook (not shown) on said bulkhead.

Also it should be noted that the top wall 6 may be inscribed with a pair of medial lines extending at right angles to each other to facilitate plotting a course.

It is to be understood that the claims are not intended to restrict the invention to the precise details illustrated, hence the claims are intended to cover such changes and modifications as come within the spirit of the invention and within the scope of the claims.

I claim:

1. A rectangular, horizontally disposed chart case having four adjoining, vertically disposed side walls, a transparent horizontally disposed top wall on the upper surface of which a course is adapted to be plotted, and a horizontally disposed bottom wall;

(a) three of said side walls being rigidly secured to said top and bottom walls;

(b) means swingably supporting the fourth side wall of the four thereof from said top wall for swinging from a closed position extending across the fourth side of said case to an open position for access to maps in said case at said fourth side, (c) a horizontal rectangular partition parallel with and spaced between said top and bottom walls separating the interior of said case into an upper compartment and a lower compartment, (d) means at the edges of said partition supporting the latter against downward movement away from said top wall and for slidable movement out of said fourth side of said case when the side wall closing said fourth side wall is swung to said open position, (e) a horizontally disposed chart supporting plate between said top wall and said partition for supporting a plurality of horizontally disposed superposed charts thereon with the uppermost chart thereof flat against the underside of said top wall and with one of the corresponding edges of such charts exposed at said fourth side and accessible to the hand of a person for successive removal of the uppermost chart edgewise through said fourth side upon tilting said plate downwardly at said fourth side when said fourth side wall is open, (f) yieldable means between said partition and said chart supporting plate for yieldably urging said plate toward said top wall for so holding such uppermost chart against said top wall and supporting said plate for so tilting said plate, (g) said yieldable means being operative for yieldably holding the edge of said plate that is remote from said upper side elevated and in engagement with the portions of such charts when the latter are supported thereon to yieldably but releasably hold such uppermost chart against accidental removal when said plate and the charts adapted to be held thereon are so tilted at said open side, (h) said lower compartment being a chart stowage compartment adapted to freely receive and to hold charts successively removed from the plurality adapted to be supported on said plate when said fourth side is in said open position, and (i) said yieldable means slidably supporting said plate for removal through said fourth open side for loading said plate with such plurality of said charts thereon at the start of a cruise.

2. In a construction as defined in claim 1, (j) the uppermost surface of such case being planar to the lateral outermost surfaces of two of the opposed side walls of said case and terminating at said surfaces whereby plotting instruments will be adapted to be flat on said upper surface when projecting laterally therefrom at one side or the other thereof in said dimension, (k) and said fourth said wall being adapted to automatically swing by gravity to said closed position to maintain said fourth side of said case closed independently of other means.

References Cited in the file of this patent

UNITED STATES PATENTS

| | | |
|---|---|---|
| 1,406,129 | Woltz | Feb. 7, 1922 |
| 1,759,544 | Croes | May 20, 1930 |
| 2,188,372 | Parker | Jan. 30, 1940 |
| 2,275,373 | Barrett | Mar. 3, 1942 |
| 2,583,647 | Haynes | Jan. 29, 1952 |